US008903230B2

(12) United States Patent
Shikama et al.

(10) Patent No.: US 8,903,230 B2
(45) Date of Patent: Dec. 2, 2014

(54) TILT-CORRECTION UNIT

(75) Inventors: Kazuo Shikama, Tokyo (JP); Yuuhei Kobayashi, Yokohama (JP); Yohsuke Ikeda, Soka (JP); Nobuaki Watanabe, Tokyo (JP); Kiyoshi Toma, Tokorozawa (JP)

(73) Assignee: Nidec Copal Corporation, Tokyo (JP)

( * ) Notice: Subject to any disclaimer, the term of this patent is extended or adjusted under 35 U.S.C. 154(b) by 17 days.

(21) Appl. No.: 13/812,049

(22) PCT Filed: Jul. 28, 2011

(86) PCT No.: PCT/JP2011/067364
§ 371 (c)(1),
(2), (4) Date: Jan. 24, 2013

(87) PCT Pub. No.: WO2012/015010
PCT Pub. Date: Feb. 2, 2012

(65) Prior Publication Data
US 2013/0121672 A1 May 16, 2013

(30) Foreign Application Priority Data
Jul. 29, 2010 (JP) ................................ 2010-170891

(51) Int. Cl.
*G03B 17/00* (2006.01)
*G02B 27/64* (2006.01)
*G03B 5/02* (2006.01)
*G03B 17/02* (2006.01)

(52) U.S. Cl.
CPC *G02B 27/64* (2013.01); *G03B 5/02* (2013.01); *G03B 17/02* (2013.01); *G03B 2205/0023* (2013.01)
USPC ...................................... 396/55; 348/208.11

(58) Field of Classification Search
USPC .............................. 348/208.7, 208.11; 396/55
See application file for complete search history.

(56) References Cited

U.S. PATENT DOCUMENTS 7,623,159 B2 * 11/2009 Wada et al. ................ 348/222.1
7,995,908 B2 *  8/2011 Chiu et al. ...................... 396/55
(Continued)

FOREIGN PATENT DOCUMENTS

JP         5-203895         8/1993
JP       2001-290184      10/2001
(Continued)

OTHER PUBLICATIONS

International Search Report issued Sep. 13, 2011 in International (PCT) Application No. PCT/JP2011/067364.
(Continued)

*Primary Examiner* — Clayton E Laballe
*Assistant Examiner* — Leon W Rhodes, Jr
(74) *Attorney, Agent, or Firm* — Wenderoth, Lind & Ponack, L.L.P.

(57) ABSTRACT

A tilt correction unit includes: an inner frame, inside which an optical unit is held; an outer frame surrounding the inner frame, with a gap formed between the inner frame and the outer frame around an entire perimeter of the inner frame; an elastic part which is disposed between the outer frame and the inner frame and elastically supports the inner frame inside the outer frame; a rotational movement support part that connects a part of an outer peripheral surface of the inner frame to a part of an inner peripheral surface of the outer frame; and a drive unit that comprises a magnet and a coil disposed opposite each other with a gap therebetween, wherein the inner frame is driven by the drive unit and rotates about the rotational support part, in a plane perpendicular to the optical axis of the optical unit.

18 Claims, 16 Drawing Sheets

(56) References Cited

U.S. PATENT DOCUMENTS

| | | | |
|---|---|---|---|
| 8,208,031 B2 * | 6/2012 | Makimoto et al. | 348/208.7 |
| 8,497,917 B2 * | 7/2013 | Ku | 348/208.99 |
| 2007/0109412 A1 * | 5/2007 | Hara | 348/207.1 |
| 2011/0122267 A1 * | 5/2011 | Ahn et al. | 348/208.7 |

FOREIGN PATENT DOCUMENTS

| | | |
|---|---|---|
| JP | 2002-303923 | 10/2002 |
| JP | 2008-3131 | 1/2008 |
| JP | 2009-20476 | 1/2009 |
| JP | 2009-42369 | 2/2009 |

OTHER PUBLICATIONS

International Preliminary Report on Patentability issued Feb. 7, 2013 in International (PCT) Application No. PCT/JP2011/067364.

* cited by examiner

TILT-CORRECTION UNIT

TECHNICAL FIELD

The present invention relates to a tilt correction unit applied to a small-sized camera, etc.

BACKGROUND ART

Conventional technologies of this field include patent documents 1 and 2 as described below. Each of the tilt correction units disclosed in patent documents 1 and 2 is installed at an anti-shake lens (or shake correction lens) and moves the lens in a direction perpendicular to an optical axis in a camera having a plurality of lens groups which are overlappingly arranged in the optical axis direction and include the anti-shake lens. The tilt correction unit of patent document 1 moves the anti-shake lens by a motor. Further, the tilt correction unit of patent document 2 moves the anti-shake lens by a drive means including a magnet and a coil.

CITATION LIST

Patent Literatures

Patent Literature 1: Japanese Unexamined Patent Application Publication No. 5-203895
Patent Literature 2: Japanese Unexamined Patent Application Publication No. 2001-290184

SUMMARY OF INVENTION

Technical Problem

However, since the tilt correction unit as described above is installed at an anti-shake lens which is a part of the plurality of lens groups, it is inevitable that the anti-shake lens should be a separate body from the other lens groups (for example, a lens for auto-focusing). Therefore, it is necessary to perform an optical axis adjustment between lenses at the time of installing the lenses, which makes it very difficult to install parts.

It is an object of the present invention to provide a tilt correction unit which enables easy assembling of parts.

Solution to Problem

A tilt correction unit in accordance with an aspect of the present invention includes: an inner frame, inside which an optical unit is held; an outer frame surrounding the inner frame, with a gap formed between the inner frame and the outer frame around an entire perimeter of the inner frame; an elastic part which is disposed between the outer frame and the inner frame and elastically supports the inner frame inside the outer frame; a rotational movement support part that connects a part of an outer peripheral surface of the inner frame to a part of an inner peripheral surface of the outer frame and forms a supporting point for a center of a rotational movement of the inner frame inside the outer frame; and a drive unit that comprises a magnet and a coil disposed opposite each other with a gap therebetween, with the magnet affixed to either the outer surface of the inner frame or the inner surface of the outer frame and the coil affixed to the other, wherein the inner frame is driven by the drive unit and rotates about the rotational support part, inside the outer frame, in a plane perpendicular to the optical axis of the optical unit.

Also, a tilt correction unit in accordance with an aspect of the present invention includes: an inner frame, inside which an image pickup element is held; an outer frame surrounding the inner frame, with a gap formed between the inner frame and the outer frame around an entire perimeter of the inner frame; an elastic part which is disposed between the outer frame and the inner frame and elastically supports the inner frame inside the outer frame; a rotational movement support part that connects a part of an outer peripheral surface of the inner frame to a part of an inner peripheral surface of the outer frame and forms a supporting point for a center of a rotational movement of the inner frame inside the outer frame; and a drive unit that comprises a magnet and a coil disposed opposite each other with a gap therebetween, with the magnet affixed to either the outer surface of the inner frame or the inner surface of the outer frame and the coil affixed to the other, wherein the inner frame is driven by the drive unit and rotates about the rotational support part, inside the outer frame, in a plane perpendicular to the optical axis of the image pickup element.

According to these tilt correction units, the optical unit or the image pickup element is held inside the inner frame. The inner frame has an outer peripheral surface, a part of which is connected to a part of an inner peripheral surface of the outer frame, and is elastically supported by the elastic part disposed between the inner frame and the outer frame. Further, the inner frame is driven by drive units, each of which has a magnet and a coil, and rotates around the rotational movement support part as a supporting point in a plane perpendicular to the optical axis within the outer frame. Simultaneously, the optical unit or the image pickup element held by the inner frame moves. In this way, by moving the optical unit or the image pickup element in a plane perpendicular to the optical axis, it is possible to perform a tilt correction of a camera. In the tilt correction unit, since the entire optical unit or the entire image pickup element is integrally maintained by means of the inner frame, it is not required to newly install an anti-shake lens or the like and it is not required to perform an optical axis adjustment at the time of assembling. As a result, it is possible to easily assemble the parts thereof. In addition, the construction can be simplified to result in contributing to the slimness thereof. Moreover, since the inner frame and the outer frame can be formed with sizes corresponding to the optical unit or the image pickup element, it is possible to add a tilt correction function to an existing optical unit or image pickup element through an additional mounting, which improves the generality of the tilt correction unit.

Here, drive units may be symmetrically disposed with respect to a plane including the rotational movement support part and the optical axis.

In this case, since the distances from the optical axis and the rotational movement support part, which serves as a supporting point for the rotational movement, to the drive units are nearly the same, the inner frame can be rotated in a balanced manner and the optical unit or the image pickup element held by the inner frame can be also moved in a balanced manner. As a result, the optical unit or the image pickup element can be moved with ease and with a high precision.

Further, elastic parts may be symmetrically disposed with respect to a plane including the rotational movement support part and the optical axis.

In this case, since the inner frame and the optical unit or the image pickup element held inside of the inner frame can be equivalently supported by the rotational movement support part and the elastic parts symmetrically disposed with respect to a plane including the rotational movement support part and the optical axis, they can be moved more smoothly by the drive units.

Further, the tilt correction unit may include a flexible substrate while the directions of larger-width surfaces of the flexible substrate are parallel to the optical axis.

The flexible substrate may be warped in directions perpendicular to the larger-width surfaces thereof. According to the above aspect, the directions of the larger-width surfaces of a part of the flexible substrate are parallel to the optical axis. As a result, a part of the flexible substrate may be warped in directions perpendicular to the optical axis, that is, in the directions in which the inner frame moves. Accordingly, it is possible to prevent the movement of the inner frame from being disturbed by the flexible substrate.

Further, the tilt correction unit may include a flexible substrate, a part of the flexible substrate may branch off into a first part and a second part, and the first part and the second part may be attached to different parts of the inner frame.

The flexible substrate has a reaction force. According to the above aspect, the reaction force of the flexible substrate is dispersed to the first part and the second part. And, since the reaction force of the first part and the reaction force of the second part act on different parts of the inner frame, the influence of the reaction force of the flexible substrate on the inner frame may be reduced.

Further, the first part and the second part may be symmetrically disposed with respect to a plane including the rotational movement support part and the optical axis.

According to this aspect, the directions of the force applied to the inner frame by the first part and the second part are nearly symmetrical with respect to the optical axis and the rotational movement support part. Therefore, the inner frame can be rotated in a balanced manner.

Further, the first part and the second part may have the same width in the direction of the optical axis.

According to this aspect, the reaction force of the first part and the second part can be made to be equal to each other.

Further, a part of the flexible substrate may be attached along the outer peripheral surface of the inner frame.

According to this aspect, even when the flexible substrate is provided, compacting of the entire tilt correction unit is achieved.

Advantageous Effects of Invention

According to the tilt correction unit as described above, it is possible to achieve easy assembling of parts.

DESCRIPTION OF EMBODIMENTS

Hereinafter, embodiments of the present invention will be described with reference to the drawings.

1$^{st}$ Embodiment

Figure 1:
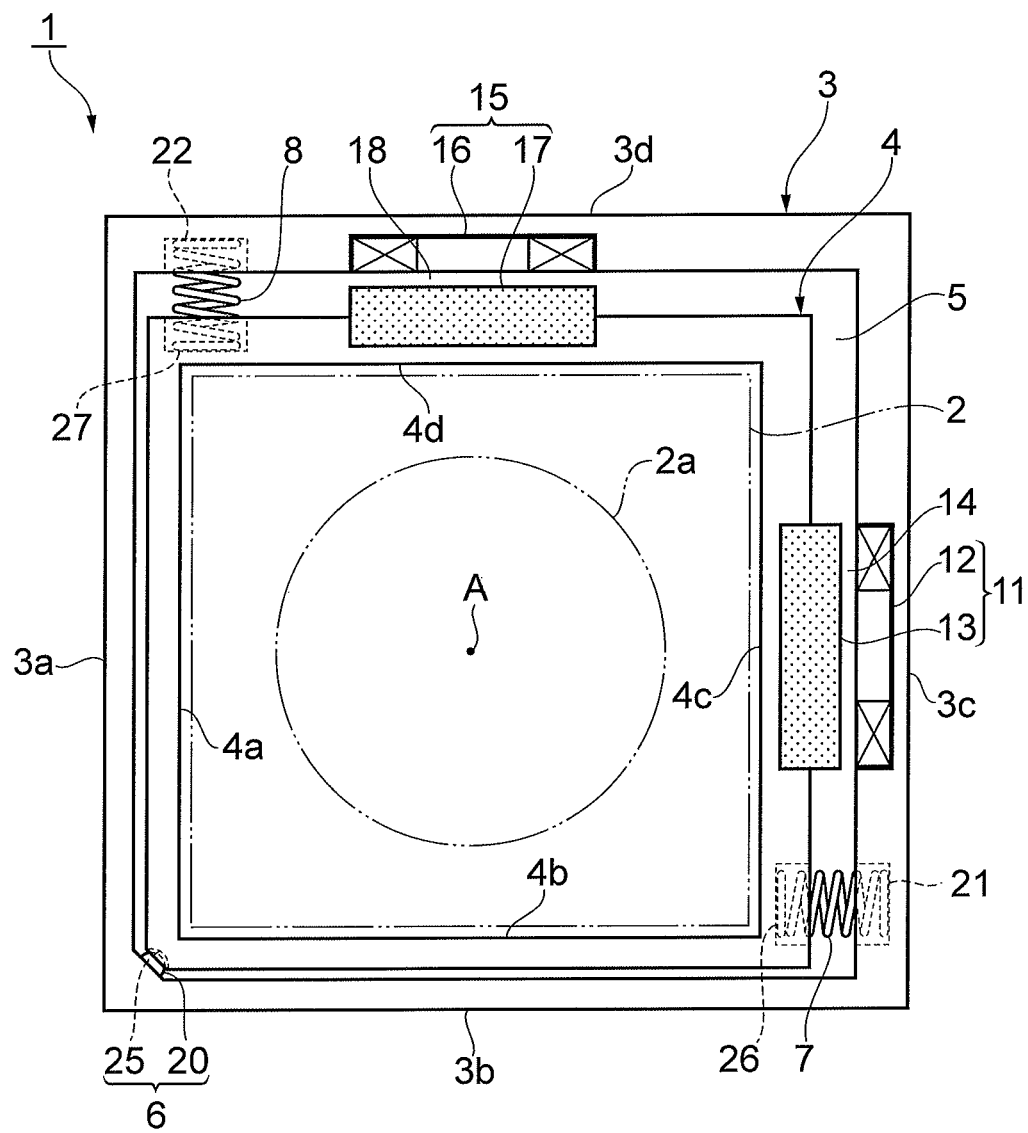
FIG. 1 is a front view of a tilt correction unit according to a first embodiment.
Figure 2:
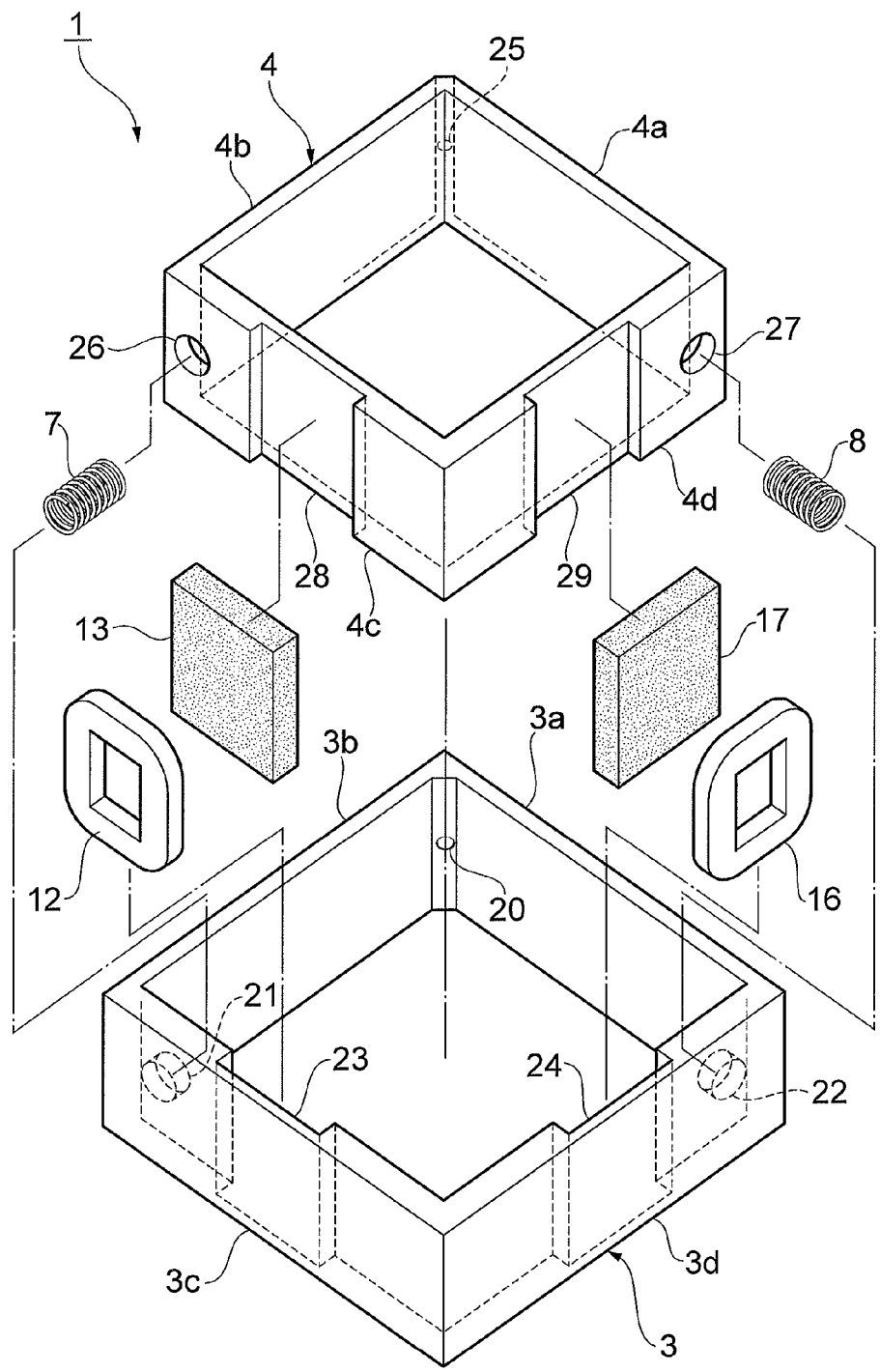
FIG. 2 is an exploded perspective view of the tilt correction unit of FIG. 1.

As shown in FIGS. 1 and 2, a tilt correction unit 1 is installed at a small-sized camera mounted to an electronic apparatus, such as a portable phone. The tilt correction unit 1 is a unit for, for example, a hand shake at the time of photographing. The tilt correction unit 1 includes a resinous outer frame 3 fixed to a frame body of an electronic apparatus and a resinous inner frame 4 disposed inside the outer frame 3.

The inner frame 4 has a shape of a flat square tube. The inner frame 4 includes wall parts 4a to 4d. The wall parts 4a and 4c are opposite to each other and the wall parts 4b and 4d are opposite to each other. Inside the inner frame 4, an optical unit 2 of the camera is held by a means (not shown) well known in the art. A lens 2a is embedded in a central portion of the optical unit 2. The optical unit 2 includes, for example, an AF (Auto Focus) mechanism or a zoom mechanism. On an optical axis A of the optical unit 2, an image pickup element (not shown), such as a CCD (Charge Coupled Device) or CMOS (Complementary Metal Oxide Semiconductor), for receiving a light condensed by the lens 2a is disposed.

The outer frame 3 has a shape of a flat square tube slightly larger than the inner frame 4. The outer frame 3 includes wall parts 3a to 3d. The wall parts 3a and 3c are opposite to each other and the wall parts 3b and 3d are opposite to each other. The wall parts 3a to 3d are opposite to the wall parts 4a to 4d with a small space from the wall parts 4a to 4d of the inner frame 4. As a result of this construction, the outer frame 3 surrounds the inner frame 4 while forming a gap 5 around the entire periphery of the inner frame 4 and between the outer frame 3 and the inner frame 4.

A protrusion 20 having a spherical shape is formed on an inner surface of a corner part interconnecting the wall part 3a and wall part 3b. Further, a recess 25 having a shape corresponding to the protrusion 20 is formed on an outer surface of a corner part interconnecting the wall part 4a and wall part 4b. A distal end part of the protrusion 20 is fitted in the recess 25, so that the inner frame 4 is held by the outer frame 3. The protrusion 20 and the recess 25 constitute a rotational movement support part 6 which serves as a supporting point for a rotation center of the inner frame 4. Since the corner parts are relatively thick even when the wall parts 3a to 3d and the wall parts 4a to 4d are thin, the rotational movement support part 6 can be easily formed. In other words, by forming the rotational movement support part 6 at the corner part, it is possible to form thin wall parts 3a to 3d and thin wall parts 4a to 4d, so as to achieve a miniaturization of the unit.

Spring receiving parts 21 and 22, each of which is a recess having a cylindrical shape, are formed at a position adjacent to the wall part 3b on the inner surface of the wall part 3c and at a position adjacent to the wall part 3a on the inner surface of the wall part 3d, respectively. Further, spring receiving parts 26 and 27 having the same shape as that of the spring receiving parts 21 and 22 are formed at a position adjacent to the wall part 4b on the outer surface of the wall part 4c and at a position adjacent to the wall part 4a on the outer surface of the wall part 4d, respectively. The spring receiving parts 26 and 27 are opposite to the spring receiving parts 21 and 22, respectively.

Both ends of a coil spring 7 are inserted in the spring receiving part 21 of the outer frame 3 and the spring receiving part 26 of the inner frame 4. Likewise, both ends of a coil spring 8 are inserted in the spring receiving part 22 of the outer frame 3 and the spring receiving part 27 of the inner frame 4. The coil springs 7 and 8 are symmetrically disposed with respect to a plane including the optical axis A and the rotational movement support part 6. The coil springs 7 and 8 elastically support the inner frame 4 within the outer frame 3.

Further, coil-fixing grooves 23 and 24, each of which is shaped like a flat rectangular parallelepiped body, are formed at a central position of the inner surface of the wall part 3c and a central position of the inner surface of the wall part 3d, respectively. Coils 12 and 16, which are wound around axes extending perpendicular to the wall parts 3c and 3d, respectively, are fitted in the coil-fixing grooves 23 and 24. The coils 12 and 16 are fixed to the outer frame 3 by means of an adhesive.

Likewise, magnet-fixing grooves 28 and 29, each of which is shaped like a flat rectangular parallelepiped body, are formed at a central position of the outer surface of the wall part 4c and a central position of the outer surface of the wall part 4d, respectively. Magnets 13 and 17, each of which is shaped like a flat rectangular parallelepiped body and is magnetized to N pole and S pole alternately in the length direction and the thickness direction of the wall part 4c or 4d, are fitted in the magnet-fixing grooves 28 and 29. The magnets 13 and 17 are fixed to the inner frame 4 by means of adhesive.

The magnet 13 is opposite to the coil 12 with a gap 14 between them. The magnet 17 is opposite to the coil 16 with a gap 18 between them. The coil 12 and the magnet 13 arranged as described above configure a drive unit 11. The coil 16 and the magnet 17 arranged as described above configure a drive unit 15. The drive units 11 and 15 are symmetrically disposed with respect to a plane including the rotational movement support part 6 and the optical axis A.

Here, a frame body of an electronic apparatus is equipped with a tilt sensor (not shown) or the like for detecting a tilt of the frame body. Based on the tilt of the frame body detected by the tilt sensor, the drive units 11 and 15 supply an electric current to the coils 12 and 16 and drive the inner frame 4. In other words, the drive units 11 and 15 move the optical unit 2 in a direction of cancelling the tilt of the frame body by means of the driving of the inner frame 4.

Figure 3:
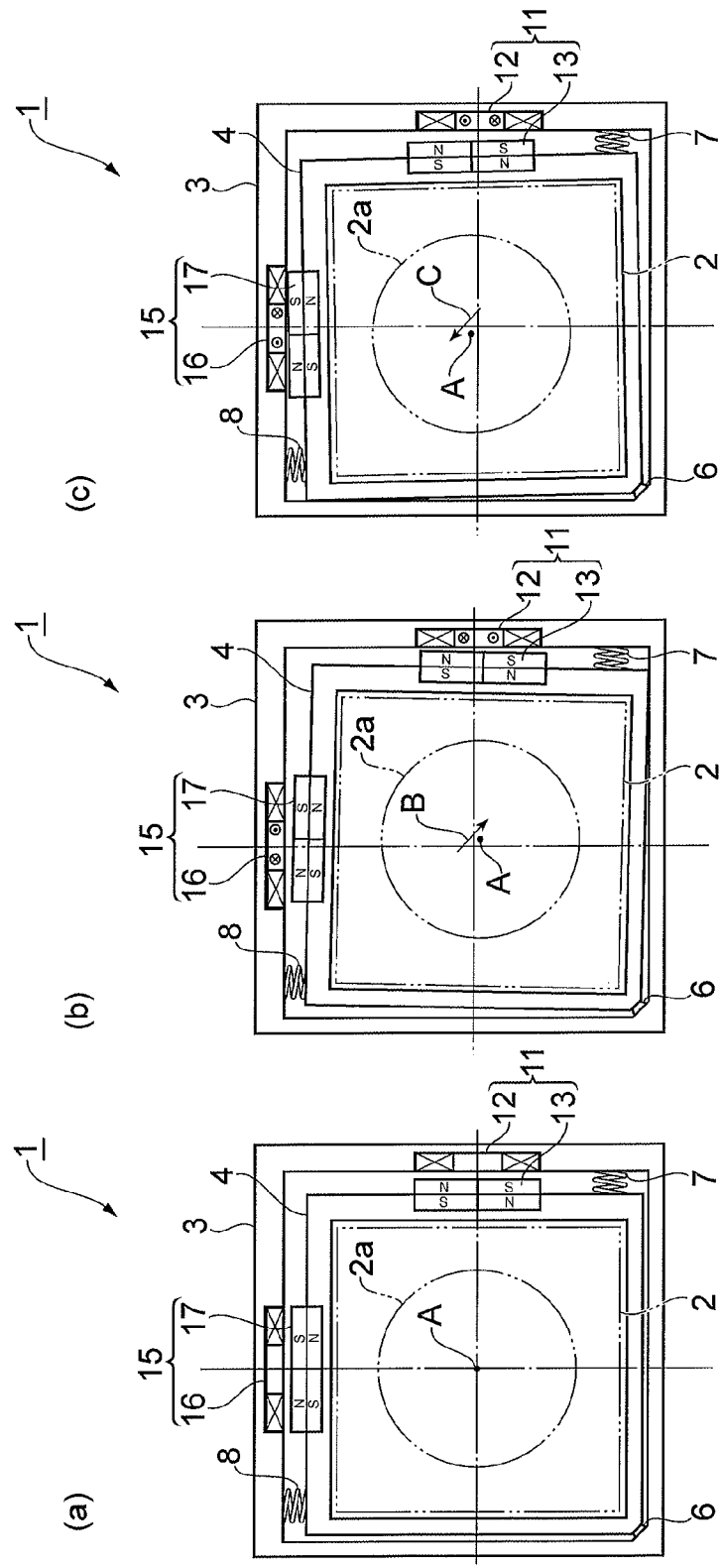
FIGS. 3A to 3C are views illustrating examples of driving in the tilt correction unit of FIG. 1.

FIG. 3A is a view illustrating a state in which an electric current does not flow through the coils 12 and 16 in the tilt correction unit 1. FIGS. 3B and 3C are views illustrating states in which an electric current flows through the coils 12 and 16 in the tilt correction unit 1. In FIGS. 3B and 3C, the electric current flows through the coils 12 and 16 in opposite directions.

As shown in FIG. 3B, by causing an electric current to flow through the coils 12 and 16, a magnetic force is generated. The generated magnetic force interferes with magnetic fluxes of the magnets 13 and 17, so that the inner frame 4 rotates around the rotational movement support part 6 as a supporting point in a clockwise direction of FIG. 3B in a plane perpendicular to the optical axis A within the outer frame 3. As a result, the optical unit 2 moves in the direction B shown in FIG. 3B.

Meanwhile, as shown in FIG. 3C, by causing an electric current to flow through the coils 12 and 16 in a reverse direction, a magnetic force in a direction opposite to that of the above case is generated. The generated magnetic force interferes with magnetic fluxes of the magnets 13 and 17, so that the inner frame 4 rotates around the rotational movement support part 6 as a supporting point in a counterclockwise direction of FIG. 3C in a plane perpendicular to the optical axis A within the outer frame 3. As a result, the optical unit 2 moves in the direction C shown in FIG. 3B.

In the tilt correction unit 1, as the inner frame 4 is driven by the drive units 11 and 15, the lens 2a moves together with the optical unit 2. By the movement of the lens 2a, a tilt correction of a camera is performed. Here, since the optical unit 2 is integrally maintained within the inner frame 4, it is not required to newly install an anti-shake lens or the like and is not required to perform an optical axis adjustment at the time of assembling, and it is possible to easily assemble the parts thereof. In addition, the construction can be simplified to result in contributing to the slimness thereof. Moreover, the inner frame 4 and the outer frame 3 may be formed with sizes corresponding to the optical unit 2, and it is possible to add a tilt correction function to an existing optical unit 2 through an additional mounting. Therefore, it can be said that the tilt correction unit 1 has a high generality.

Further, since the drive units 11 and 15 are symmetrically disposed with respect to a plane including the rotational movement support part 6 and the optical axis A, the distances from the rotational movement support part 6 to the drive units 11 and 15 are nearly the same. Therefore, the inner frame 4 can be rotated in a balanced manner and the optical unit 2 can be moved in a balanced manner. As a result, the optical unit 2 can be moved with ease and with a high precision.

Also, since the coil springs 7 and 8 are symmetrically disposed with respect to a plane including the rotational movement support part 6 and the optical axis A, the coil springs 7 and 8 and the rotational movement support part 6 can equivalently support the inner frame 4 and the optical unit 2. Therefore, the drive units 11 and 15 can smoothly move them.

$2^{nd}$ Embodiment

Figure 4:
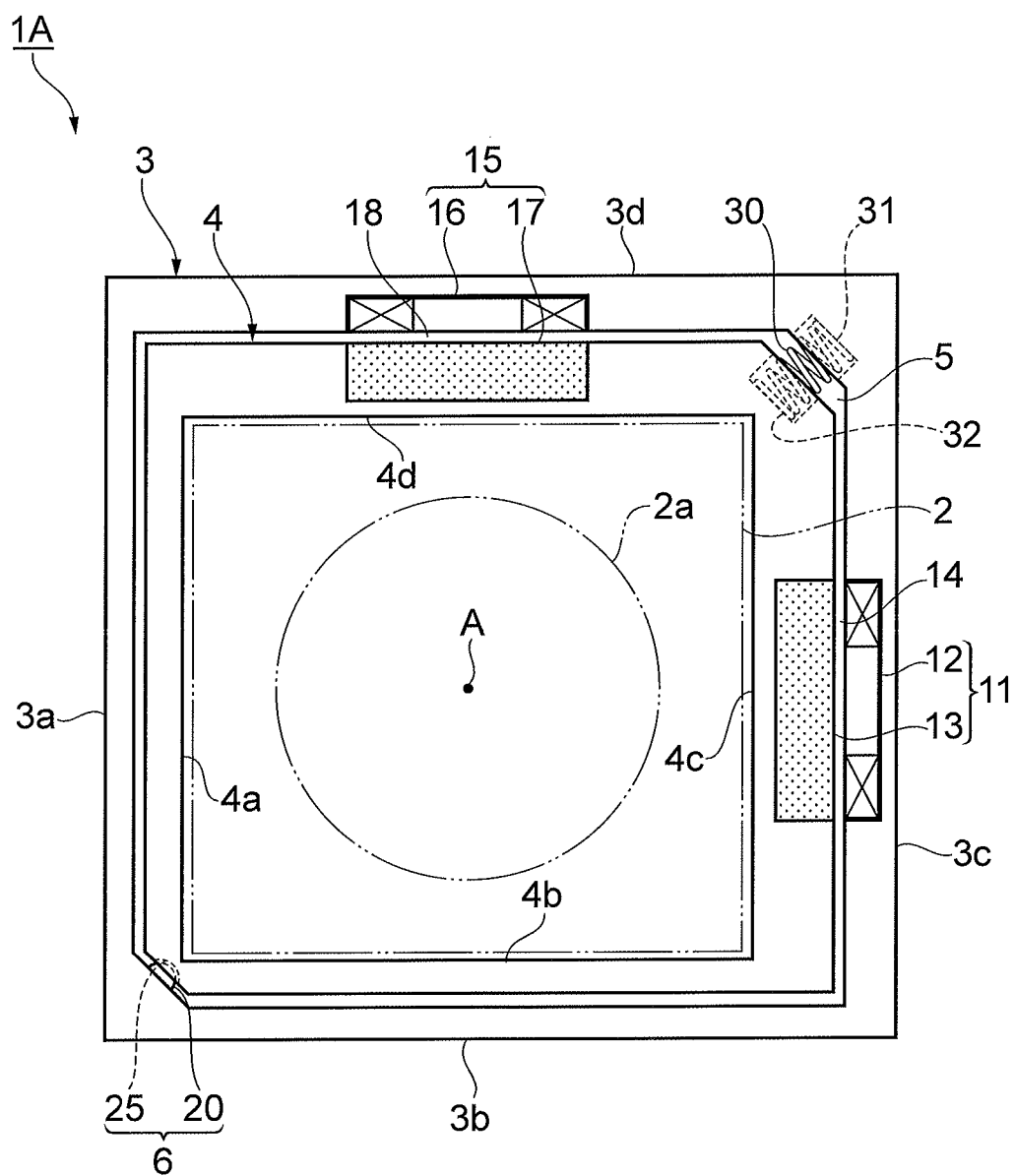
FIG. 4 is a front view of a tilt correction unit according to a second embodiment.
Figure 5:
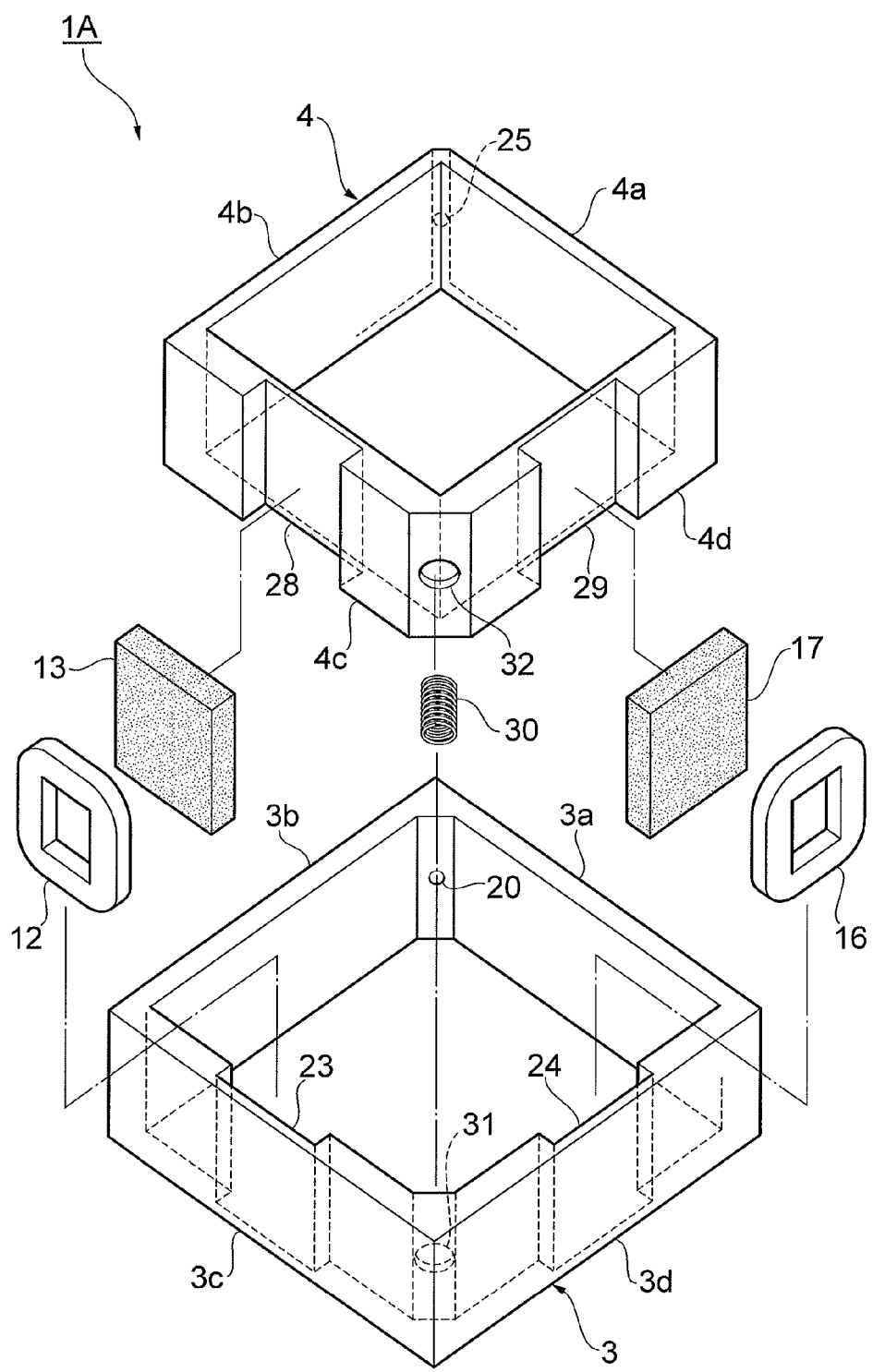
FIG. 5 is an exploded perspective view of the tilt correction unit of FIG. 4.

FIGS. 4 and 5 are views showing a tilt correction unit 1A according to the second embodiment. As shown in FIGS. 4 and 5, the tilt correction unit 1A includes a coil spring 30, which is inserted in spring receiving parts 31 and 32 and is disposed at a corner diagonally opposite to the rotational movement support part 6, in place of the coil springs 7 and 8 of the tilt correction unit 1 (see FIG. 1). The tilt correction unit 1A having the construction as described above may also have the same function and effect as those of the tilt correction unit 1.

$3^{rd}$ Embodiment

Figure 6:
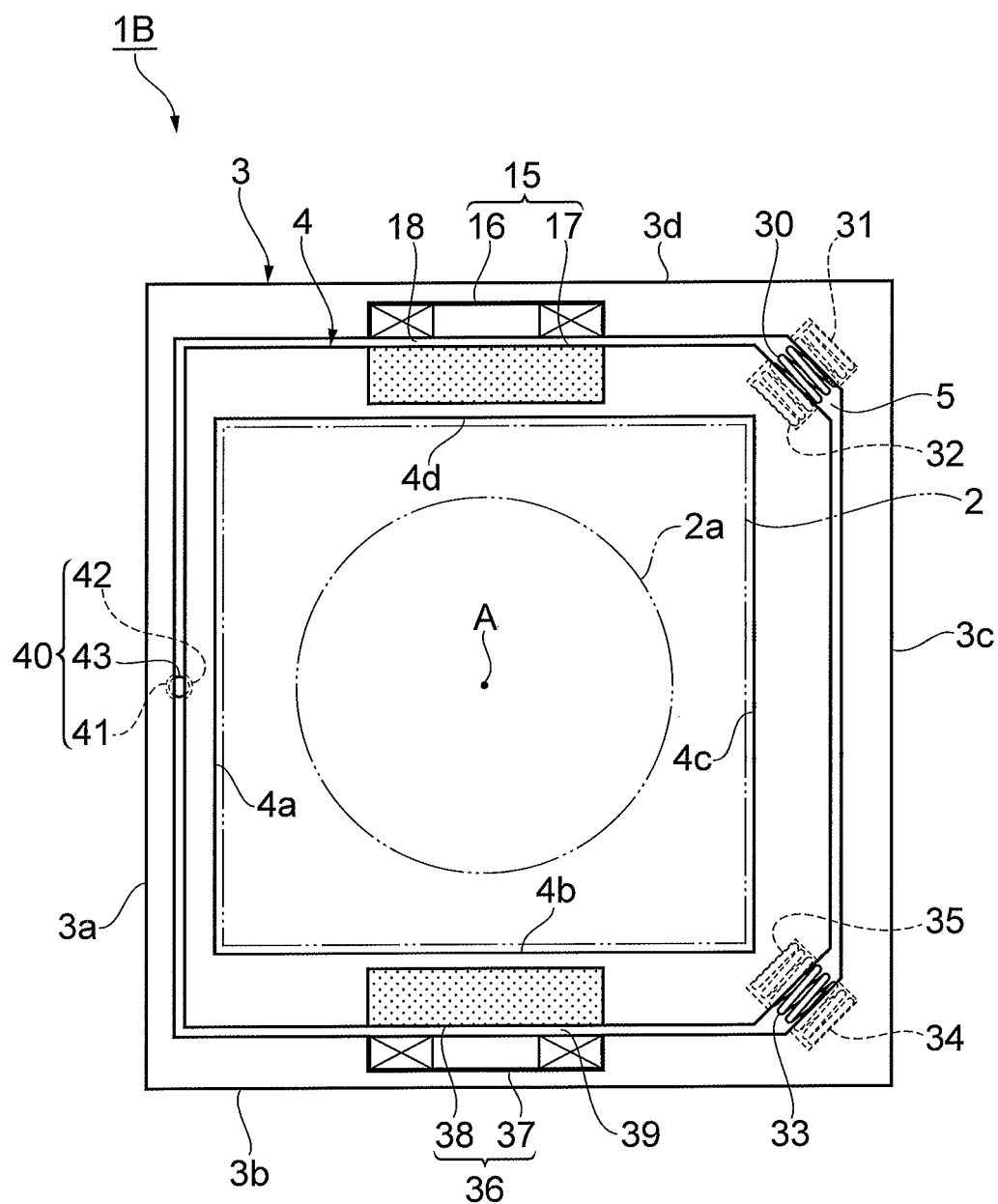
FIG. 6 is a front view of a tilt correction unit according to a third embodiment.
Figure 7:
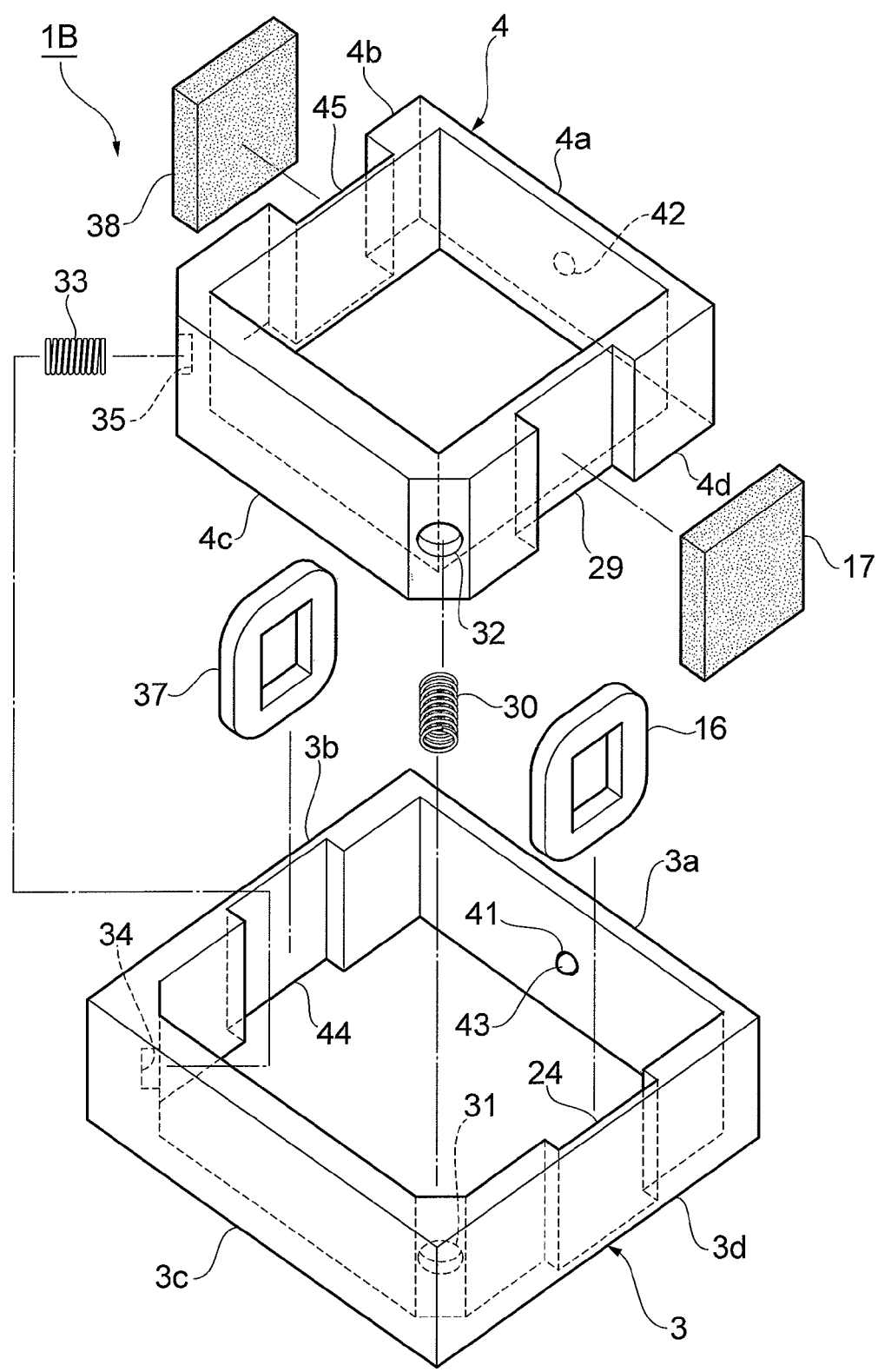
FIG. 7 is an exploded perspective view of the tilt correction unit of FIG. 6.

FIGS. 6 and 7 are views showing a tilt correction unit 1B according to the third embodiment. As shown in FIGS. 6 and 7, the tilt correction unit 1B includes a rotational movement support part 40, which is arranged at central positions of the wall part 3a and the wall parts 4a, in place of the rotational movement support part 6 of the tilt correction unit 1A (see FIG. 4). The rotational movement support part 40 includes a conical or semispherical recess 41 formed on an inner surface of the wall part 3a, a conical or semispherical recess 42 formed on an outer surface of the wall part 4a, and a ball 43 which is disposed within the recess 41 and the recess 42 and is sandwiched by the wall part 3a and the wall parts 4a.

Further, coil springs 30 and 33, which are respectively inserted in spring receiving parts 31 and 32 and spring receiving parts 34 and 35, are disposed at both ends of the wall part 3c and the wall part 4c. Moreover, a drive unit 36 opposite to the drive unit 15 with the optical unit 2 between them is disposed instead of the drive unit 11 of the tilt correction unit 1A (see FIG. 4). The drive unit 36 has a coil 37 fixed in a coil-fixing groove 44 of the wall part 3b. A magnet 38 is fixed in a magnet-fixing groove 45 of the wall part 4b. The coil 37 and the magnet 38 are opposite to each other with a gap 39 between them.

The coil springs 30 and 33 are symmetrically disposed with respect to a plane including the rotational movement support part 40 and the optical axis A. The drive units 15 and 36 are symmetrically disposed with respect to the plane including the rotational movement support part 40 and the optical axis A. The tilt correction unit 1B having the construction as described above may also have the same function and effect as those of the tilt correction units 1 and 1A.

4th Embodiment

Figure 8:
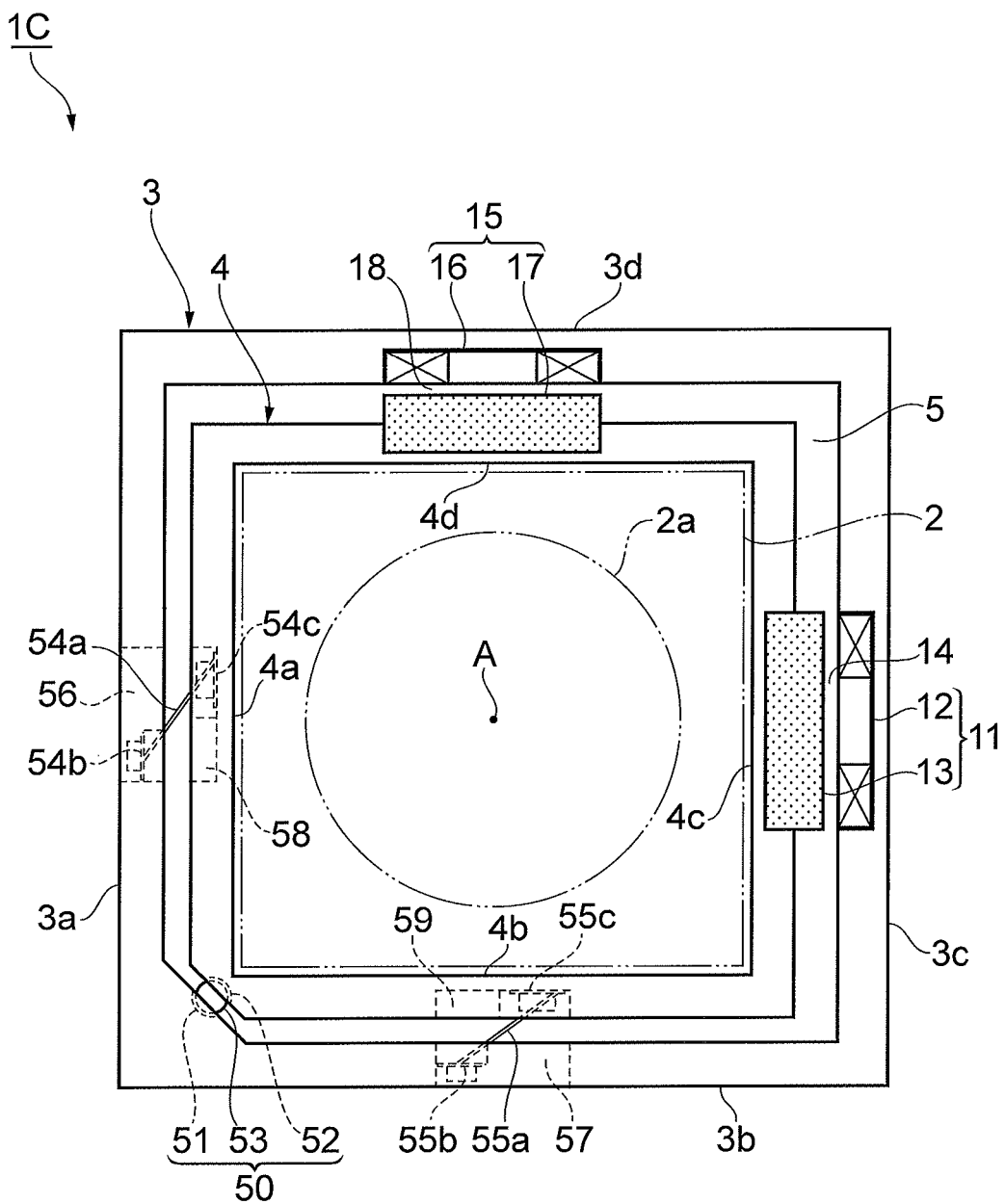
FIG. 8 is a front view of a tilt correction unit according to a fourth embodiment.
Figure 9:
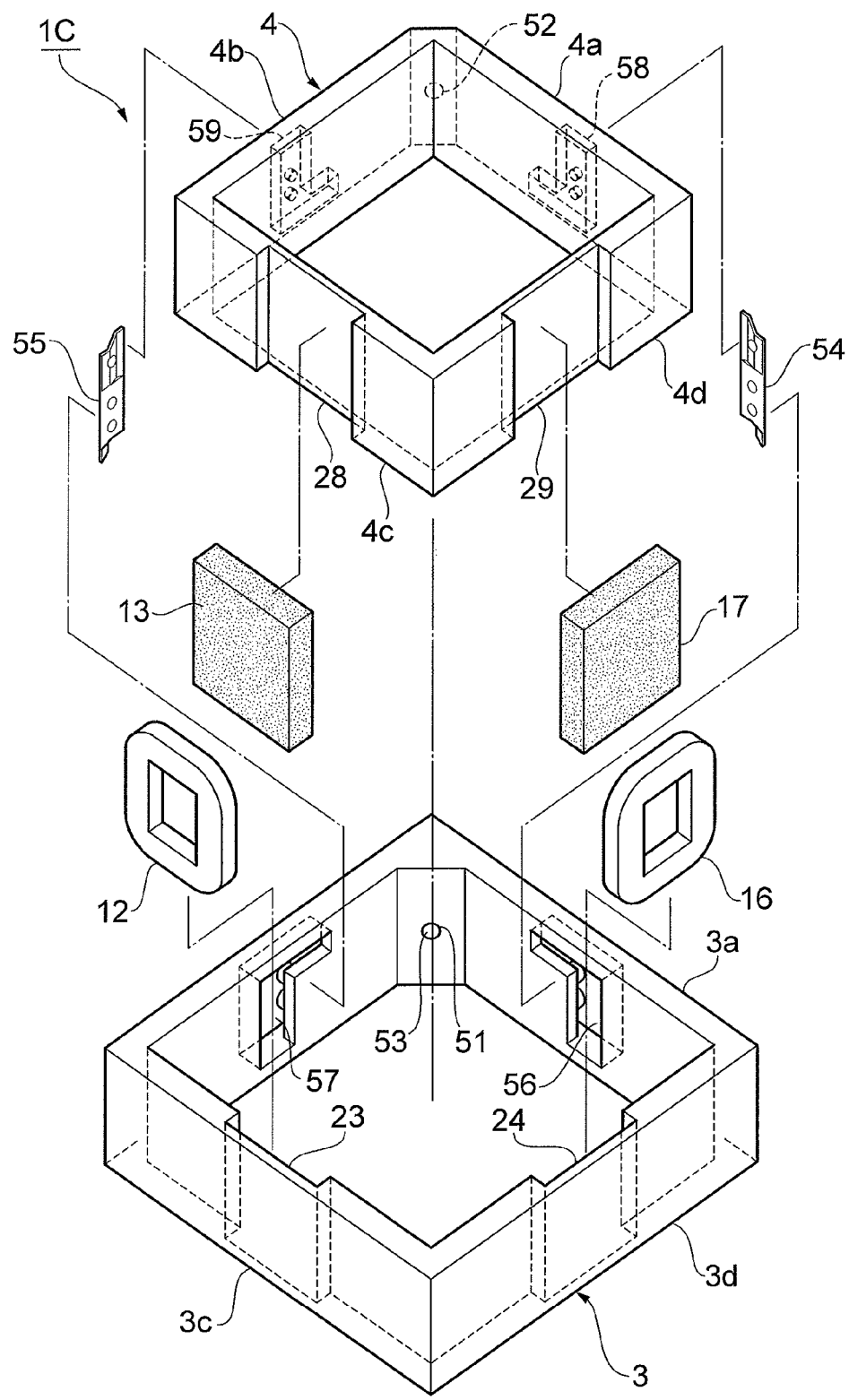
FIG. 9 is an exploded perspective view of the tilt correction unit of FIG. 8.

FIGS. 8 and 9 are views showing a tilt correction unit 1C according to the fourth embodiment. As shown in FIGS. 8 and 9, the tilt correction unit 1C includes a rotational movement support part 50 in place of the rotational movement support part 6 of the tilt correction unit 1 (see FIG. 1). The rotational movement support part 50 includes a conical or semispherical recess 51 formed on an inner surface of a corner part connecting the wall part 3a and the wall part 3b, a conical or semispherical recess 52 formed on an outer surface of a corner part connecting the wall part 4a and the wall part 4b, and a ball 53 which is disposed within the recesses 51 and 52 and is sandwiched by the opposite corner parts.

Further, in place of the coil springs 7 and 8 of the tilt correction unit 1 (see FIG. 1), plate springs 54 and 55 are disposed at a central position of the wall part 3a and the wall part 4a and at a central position of the wall part 3b and the wall part 4b, respectively. One end 54b of the Z type plate spring 54 is fixed to an outer wall surface of the wall part 3a. The other end 54c of the plate spring 54 is fixed within a recess 58 on an outer wall surface of the wall part 4a. A spring piece 54a connecting the one end 54b and the other end 54c protrudes from a hole part 56. Likewise, one end 55b of the Z type plate spring 55 is fixed to an outer wall surface of the wall part 3b. The other end 55c of the plate spring 55 is fixed within a recess 59 on an outer wall surface of the wall part 4b. A spring piece 55a connecting the one end 55b and the other end 55c protrudes from a hole part 57.

The plate springs 54 and 55 are symmetrically disposed with respect to a plane including the rotational movement support part 50 and the optical axis A. The tilt correction unit 1C having the construction as described above may also have the same function and effect as those of the tilt correction units 1, 1A, and 1B.

5th Embodiment

Figure 10:
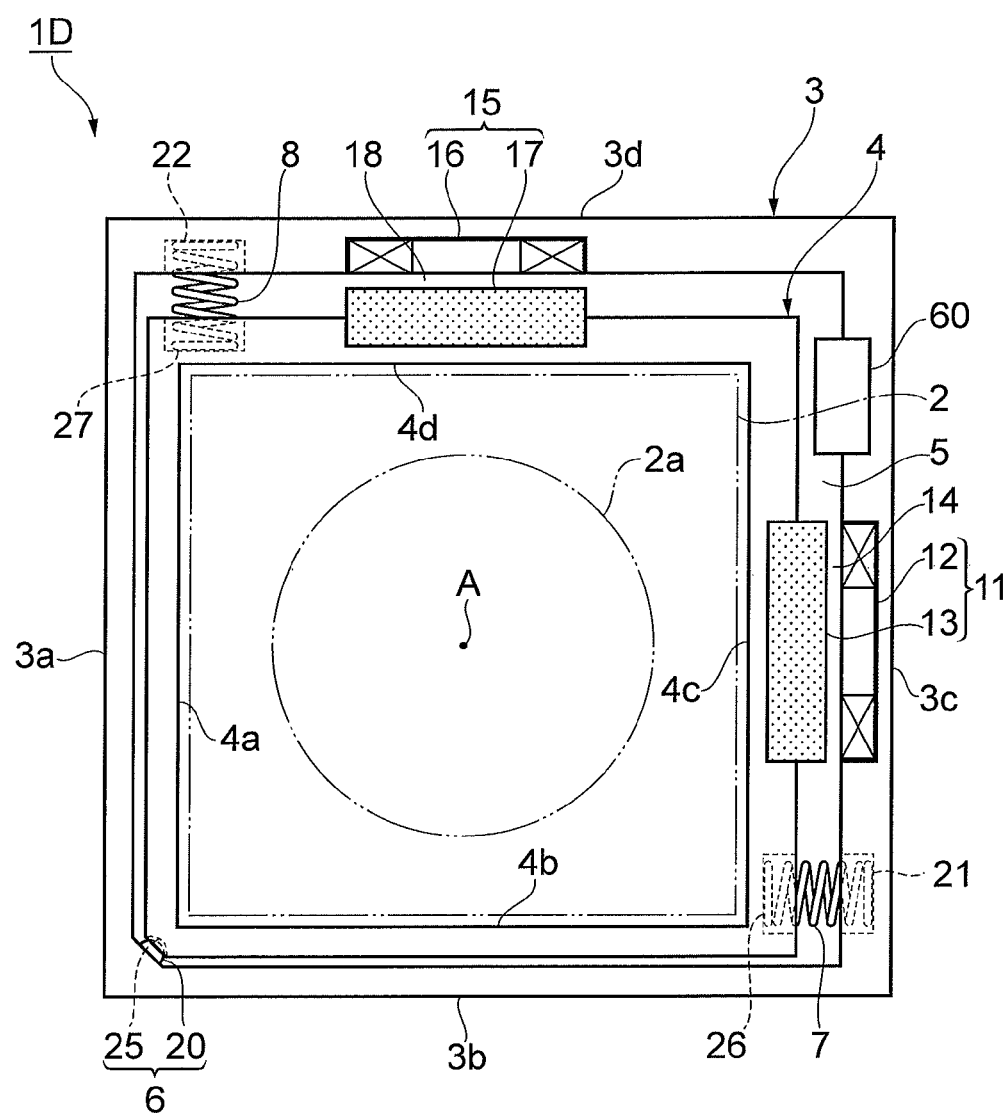
FIG. 10 is a front view of a tilt correction unit according to a fifth embodiment.

FIG. 10 is a front view of a tilt correction unit 1D according to the fifth embodiment. The tilt correction unit 1D is provided with a tilt position detecting unit 60 for detecting a tilt of the tilt correction unit 1D itself, in addition to the elements of the tilt correction unit 1 (see FIG. 1). The tilt position detecting unit 60 is fixed to an inner surface of the wall part 3c. A gyro sensor, for example, may be used as the tilt position detecting unit 60. Since the tilt correction unit 1D includes the tilt position detecting unit 60 as described above, the tilt correction unit 1D can detect its tilt by itself even when a tilt sensor is not mounted in a frame body of an electronic apparatus. Moreover, the tilt correction unit 1D can correct the tilt by driving the inner frame 4 based on the detected tilt.

6th Embodiment

Figure 11:
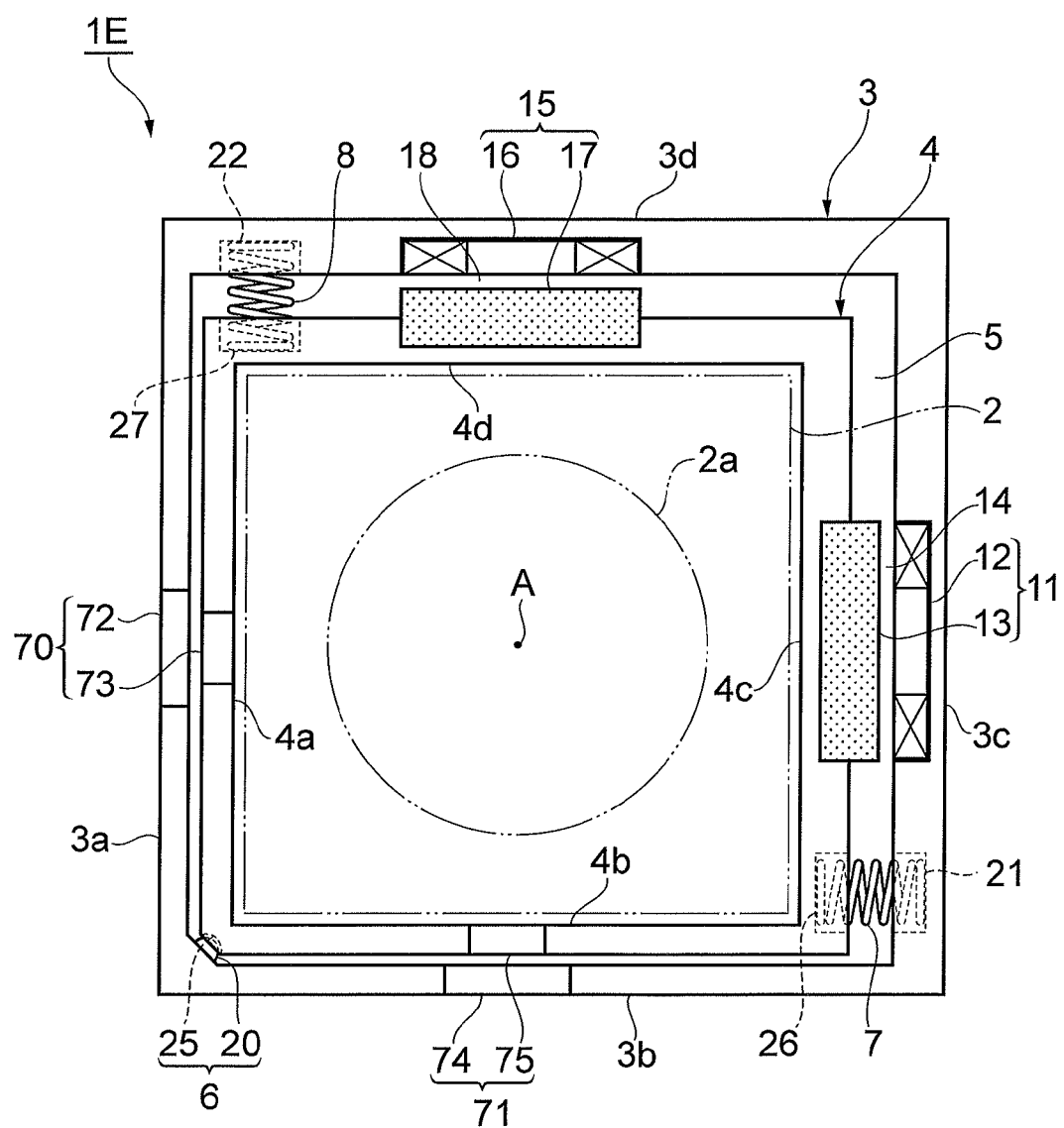
FIG. 11 is a front view of a tilt correction unit according to a sixth embodiment.

FIG. 11 is a front view of a tilt correction unit 1E according to the sixth embodiment. The tilt correction unit 1E is provided with rotational movement position detecting units 70 and 71 for detecting a position of the inner frame 4 with reference to the outer frame 3, in addition to the elements of the tilt correction unit 1 (see FIG. 1). The rotational movement position detecting unit 70 includes a magnet 72 buried in the wall part 3a and a sensor unit 73 buried in the wall part 4a and opposite to the magnet 72. The rotational movement position detecting unit 71 includes a magnet 74 buried in the wall part 3b and a sensor unit 75 buried in the wall part 4b and opposite to the magnet 74. The sensor units 73 and 75 are provided with, for example, hall elements, so as to detect the distances between the sensor units 73 and 75 and the magnets 72 and 74. By the tilt correction unit 1E having the construction described above, since it is possible to detect the position of the inner frame 4 driven by the drive units 11 and 15, it is possible to achieve a more precise position control of the optical unit 2.

7th Embodiment

Figure 12:
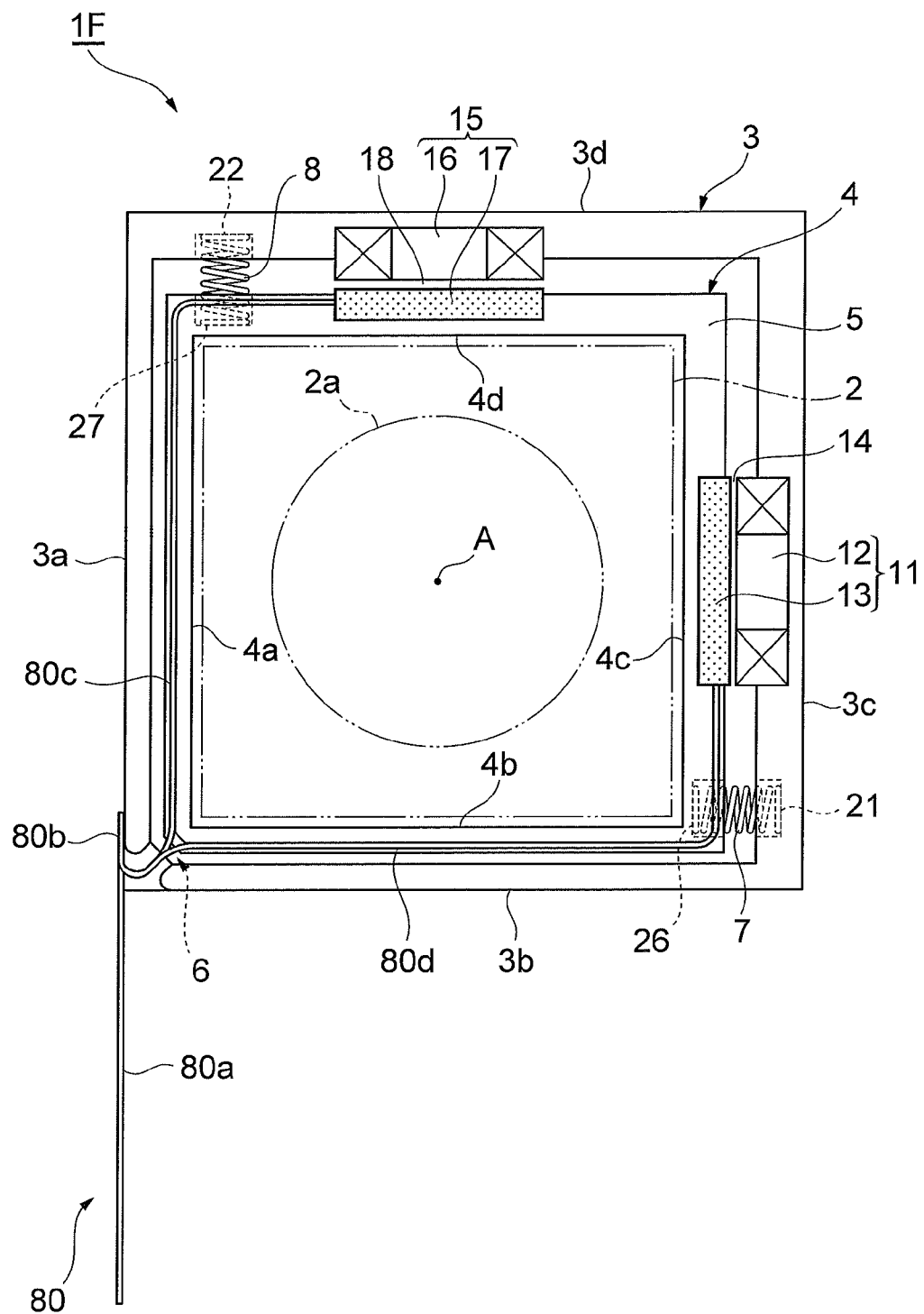
FIG. 12 is a front view of a tilt correction unit according to a seventh embodiment.
Figure 13:
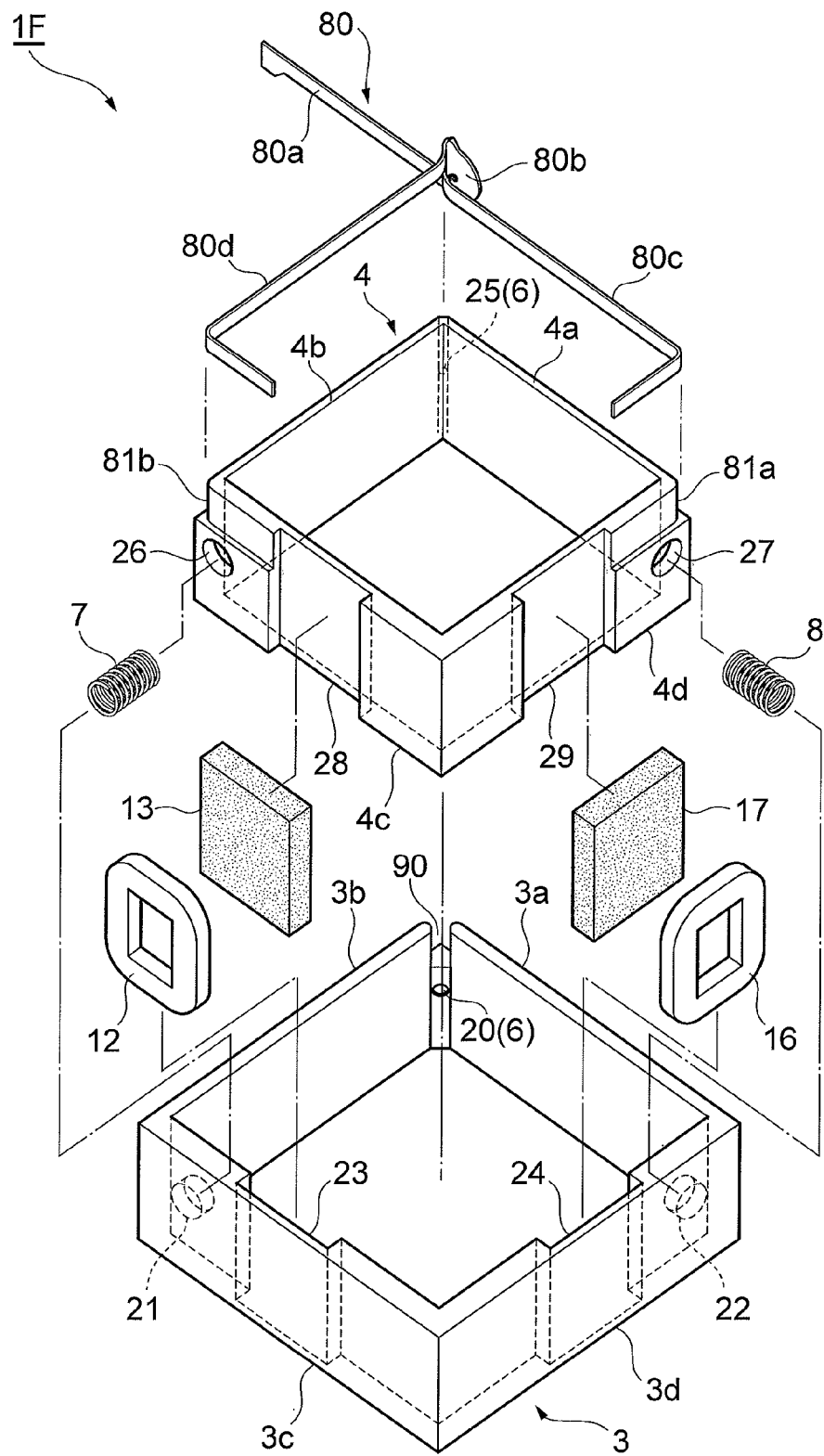
FIG. 13 is an exploded perspective view of the tilt correction unit of FIG. 12.

FIGS. 12 and 13 are views of a tilt correction unit 1F according to the seventh embodiment. As shown in FIGS. 12 and 13, the tilt correction unit 1F is provided with a flexible substrate (Flexible Printed Circuit; hereinafter, referred to as "FPC") 80, in addition to the elements of the tilt correction unit 1 (see FIG. 1). The FPC 80 corresponds to a printed substrate for enabling electric current to flow through an AF mechanism or the like of the optical unit 2 maintained within the inner frame 4. The FPC 80 includes a terminal part 80a of an elongated shape connected to an external power source, a locking part 80b locked on an outer peripheral surface of the wall part 3a of the outer frame 3, and two current-carrying parts 80c and 80d of an elongated shape attached along an outer peripheral surface of the inner frame 4.

Each of the surfaces (larger-width surfaces) of the terminal part 80a, the locking part 80b, and the current-carrying parts 80c and 80d is oriented in parallel to the optical axis A. That is, the directions of the larger-width surfaces of the FPC 80 are parallel to the optical axis A. A part of the FPC 80 branches off into two parts. One of the branched two parts corresponds to the current-carrying part 80c as a first part, and the other of the branched two parts corresponds to the current-carrying part 80d as a second part. The part at which the FPC 80A branches off into the current-carrying part 80c and the current-carrying part 80d is located at the corner part connecting the wall part 3a and the wall part 3b. In other words, a base end of the current-carrying parts 80c and 80d is located adjacent to the rotational movement support part 6.

The outer frame 3 has a cut-out part 90 formed at the corner part connecting the wall part 3a and the wall part 3b. The base end of the current-carrying parts 80c and 80d is disposed at the cut-out part 90. The formation of the cut-out part 90 facilitates the wiring to the outside through the FPC 80. In the FPC 80, the locking part 80b is locked on the outer peripheral surface of the wall part 3a of the outer frame 3, and the current-carrying parts 80c and 80d is locked on the outer peripheral surface of the inner frame 4. The base end of the current-carrying parts 80c and 80d is suspended around the rotational movement support part 6 between the outer frame 3 and the inner frame 4.

Now, the current-carrying parts 80c and 80d are described in more detail. The current-carrying part 80c passes through the cut-out part 90, i.e. a part adjacent to the rotational movement support part 6, is bent in one direction among the opposite directions in which the inner frame 4 moves, and is then wired onto the inner frame 4. The current-carrying part 80c extends in a shape of the letter "L" and is attached along a part of the wall part 4a and the wall part 4d of the inner frame 4. A groove 81a in which the current-carrying part 80c is inserted is formed on the wall part 4a and a part of the wall part 4d. The current-carrying part 80d passes through the cut-out part 90, i.e. a part adjacent to the rotational movement support part 6, is bent in the other direction among the opposite directions in which the inner frame 4 moves, and is then wired onto the inner frame 4. The current-carrying part 80d extends in a shape of the letter "L" and is attached along a part of the wall part 4b and the wall part 4c of the inner frame 4. A groove 81b in which the current-carrying part 80d is inserted is formed on the wall part 4b and a part of the wall part 4c. The current-carrying parts 80c and 80d are symmetrically disposed with respect to a plane including the rotational movement support part 6 and the optical axis A. The current-carrying parts 80c and 80d have the same width in the direction of the optical axis A.

In the tilt correction unit 1F, the FPC 80 may be warped in directions perpendicular to the larger-width surfaces thereof. The directions perpendicular to the larger-width surfaces of the current-carrying parts 80c and 80d are parallel to the optical axis A. As a result, the current-carrying parts 80c and 80d may be warped in directions perpendicular to the optical axis A, that is, in the directions in which the inner frame 4 moves (see direction B of FIG. 3b and direction C of FIG. 3). Accordingly, the current-carrying parts 80c and 80d can easily move along the inner frame 4. Further, the current-carrying parts 80c and 80d can prevent the movement of the inner frame from being disturbed by the FPC 80.

Further, a part of the FPC 80 is divided into the current-carrying part 80c and the current-carrying part 80d, and the current-carrying part 80c and the current-carrying part 80d are attached to different parts of the inner frame 4. Usually, the FPC 80 has a reaction force, wherein the reaction force of the FPC 80 is dispersed to the current-carrying part 80c and the current-carrying part 80d. Also, since the reaction force of the current-carrying part 80c and the reaction force of the current-carrying part 80d act on different parts of the inner frame 4, the influence of the reaction force of the FPC 80 on the inner frame 4 may be reduced. In general, the smaller and the slimmer the actuator, the larger the influence of the FPC 80. Since the tilt correction unit 1F can restrain the reaction force of the FPC 80, the construction of the current-carrying parts 80c and 80d branched off in two directions is especially effective.

Moreover, the current-carrying parts 80c and 80d are symmetrically disposed with respect to a plane including the rotational movement support part 6 and the optical axis A. Therefore, the directions of the force applied to the inner frame 4 by the current-carrying parts 80c and 80d are nearly symmetrical with respect to the optical axis A and the rotational movement support part 6. Therefore, the inner frame 4 can be rotated in a balanced manner.

Further, the current-carrying part 80c and the current-carrying part 80d have the same width in the direction of the optical axis A. Therefore, the reaction force of the current-carrying part 80c and the reaction force of the current-carrying part 80d can be made to be equal to each other. This construction is also effective especially in a small and slim type tilt correction unit 1F.

Further, the current-carrying parts 80c and 80d are attached along the outer peripheral surfaces of the inner frame 4. Therefore, even when the FPC 80 is provided, compacting of the entire tilt correction unit 1F is achieved.

8$^{th}$ Embodiment

Figure 14:
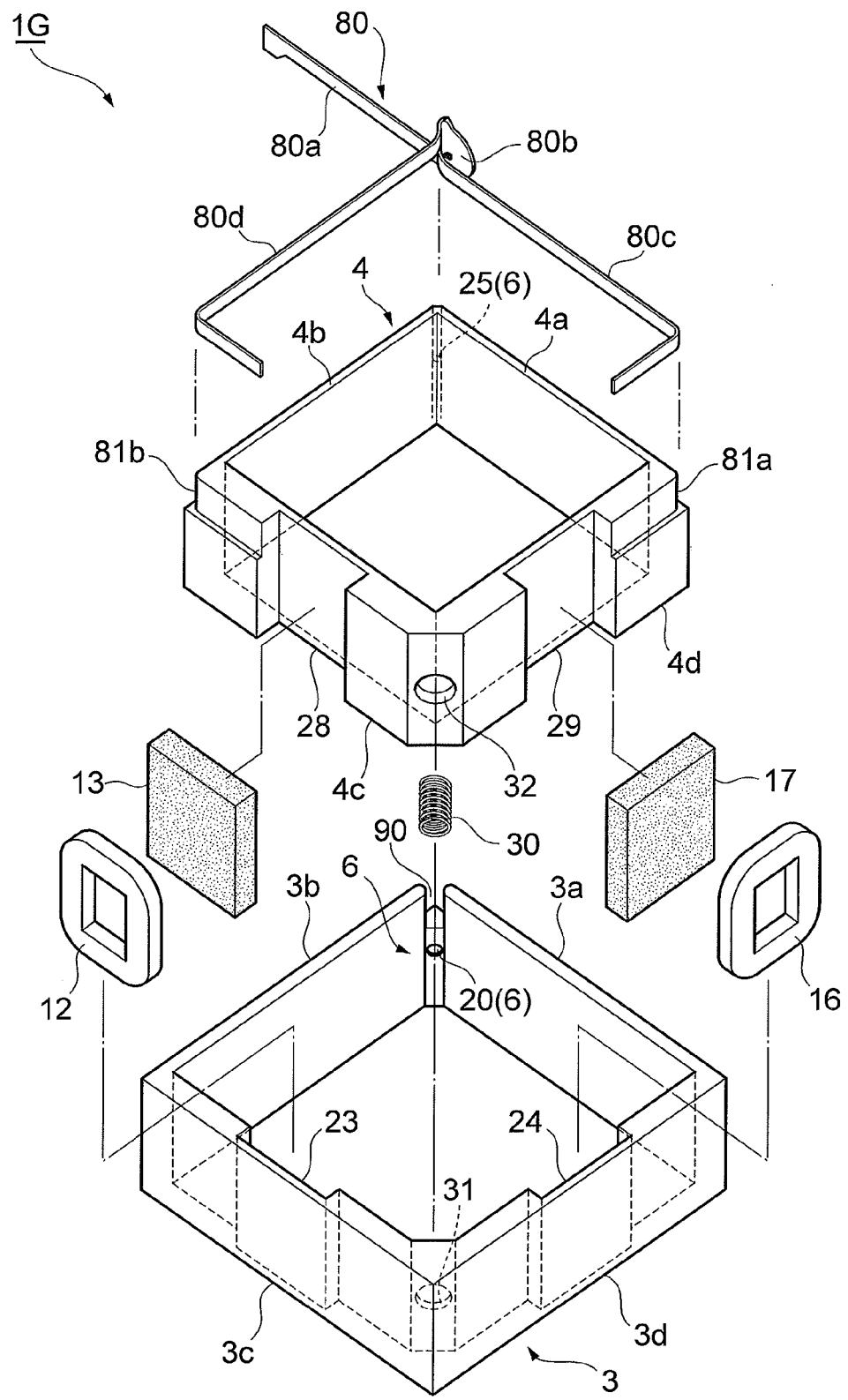
FIG. 14 is an exploded perspective view of a tilt correction unit according to an eighth embodiment.

FIG. 14 is an exploded perspective view of a tilt correction unit 1G according to the eighth embodiment. The tilt correction unit 1G is provided with an FPC 80 which is the same as that of the tilt correction unit 1F, in addition to the elements of the tilt correction unit 1A shown in FIGS. 4 and 5. The tilt correction unit 1G has the same functions and effects as those of the tilt correction unit 1F.

9$^{th}$ Embodiment

Figure 15:
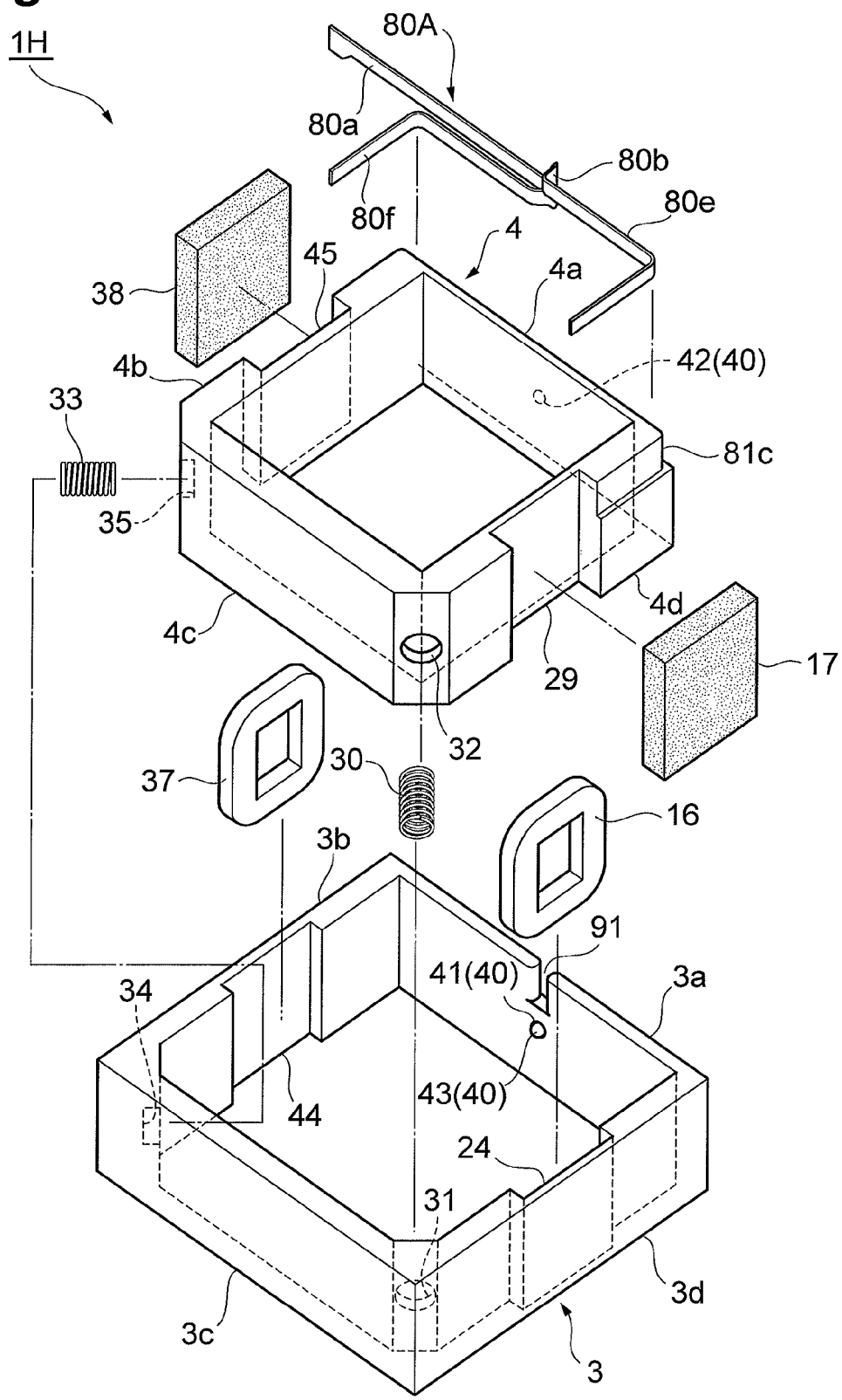
FIG. 15 is an exploded perspective view of a tilt correction unit according to a ninth embodiment.
Figure 16:
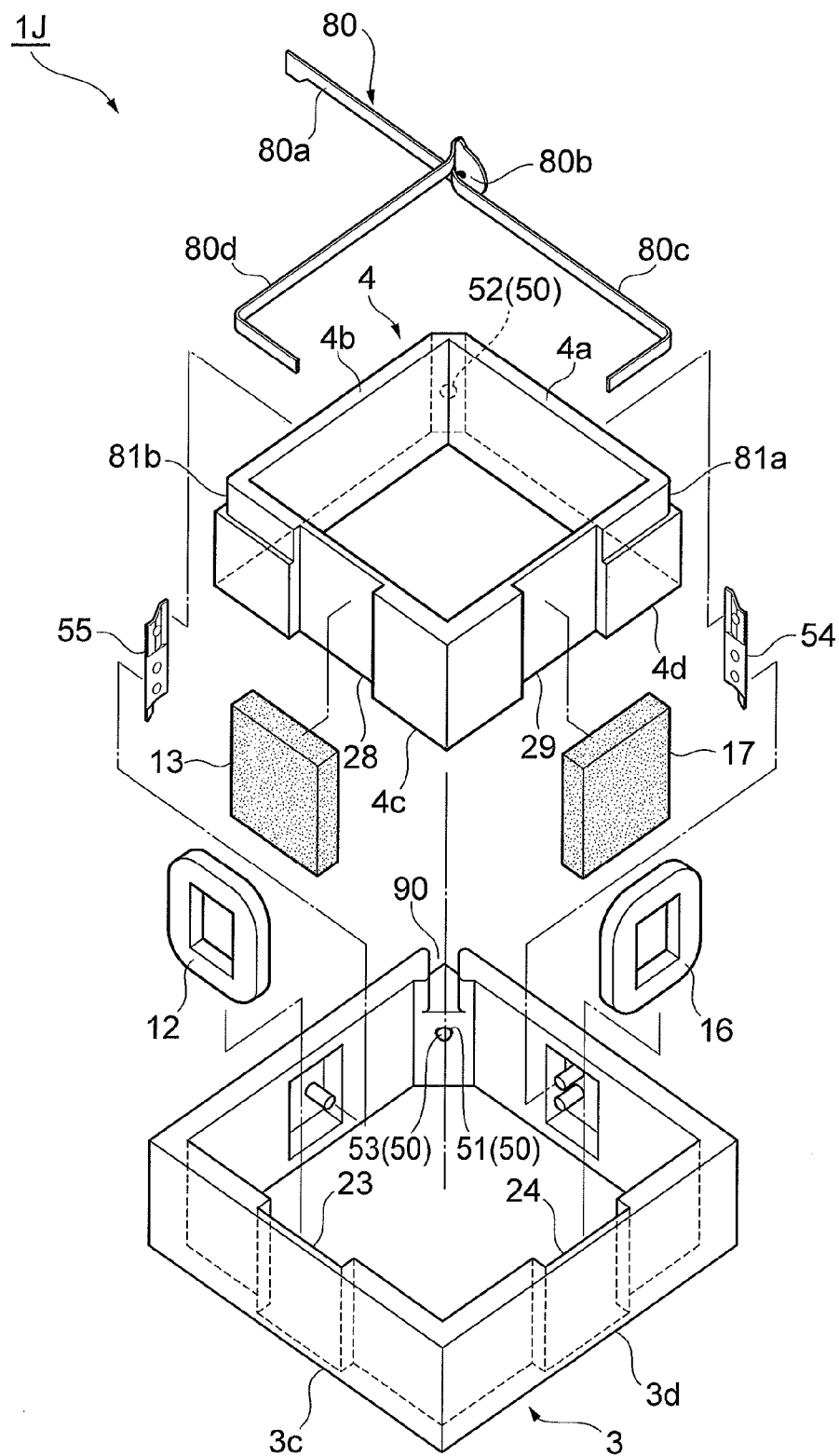
FIG. 16 is an exploded perspective view of a tilt correction unit according to a tenth embodiment.

FIG. 15 is an exploded perspective view of a tilt correction unit 1H according to the ninth embodiment. The tilt correction unit 1H is provided with an FPC 80A, in addition to the elements of the tilt correction unit 1B shown in FIGS. 6 and 7. The FPC 80A includes a terminal part 80a of an elongated shape connected to an external power source, a locking part 80b locked on an outer peripheral surface of the wall part 3a of the outer frame 3, and two current-carrying parts 80e and 80f of an elongated shape attached along an outer peripheral surface of the inner frame 4. Each of the surfaces (larger-width surfaces) of the terminal part 80a, the locking part 80b, and the current-carrying parts 80e and 80f is oriented in parallel to the optical axis A. The part at which the FPC 80A branches off into the current-carrying part 80e and the current-carrying part 80f is located at a central part of the wall part 3a. A base end of the current-carrying parts 80e and 80f is located adjacent to the rotational movement support part 40. The outer frame 3 has a cut-out part 91 formed at a central position of the wall part 3a. A groove 81a in which the current-carrying parts 80e and 80f are inserted is formed on the wall part 4a, a part of the wall part 4b, and a part of the wall part 4d. Each of the current-carrying parts 80e and 80f extends in a shape of the letter "L". The current-carrying parts 80e and 80f are symmetrically disposed with respect to a plane including the rotational movement support part 40 and the optical axis A. The current-carrying parts 80e and 80f have the same width in the direction of the optical axis A. The tilt correction unit 1H having the construction described above has the same functions and effects as those of the tilt correction units 1F and 1G 10$^{th}$ Embodiment FIG. 16 is an exploded perspective view of a tilt correction unit 1J according to the tenth embodiment. The tilt correction unit 1J is provided with Z type plate springs 54 and 55, like the tilt correction unit 1C shown in FIGS. 8 and 9. The tilt correction unit 1J is provided with the same FPC 80 as that of the tilt correction unit 1F. The tilt correction unit 1J has the same functions and effects as those of the tilt correction units 1F to 1H.

Although various embodiments of the present invention have been described above, the present invention is not limited to the embodiments described above. For example, although the optical unit 2 is held inside the inner frame 4 in the above embodiments, the lens 2a itself may be held in the inner frame 4. Further, an image pickup element, such as a CCD or CMOS, disposed on the optical axis A may be fixed within the inner frame 4. As an image pickup element is held within the inner frame 4, the image pickup element can be moved, which also enables a tilt correction. Meanwhile, when an FPC is installed, the FPC is used as a substrate for enabling an electric current to flow through the image pickup element.

Further, in the above description of the embodiments, the coils are fixed to the outer frame 3 and the magnets are fixed to the inner frame 4. However, in contrast to the above description, the magnets may be fixed to the outer frame 3 while the coils are fixed to the inner frame 4. In the case where an FPC is installed, the FPC may enable an electric current to flow through the coils of the inner frame 4 also.

In addition, although the above description of the embodiments is based on the case of employing a double frame structure according to the outer frame 3 and the inner frame 4, it is possible to employ a triple frame structure by arranging an outermost frame additionally surrounding the outer frame 3. In the case of employing a triple frame structure, the outermost frame may be fixed to a frame body of an electronic apparatus while a second rotational movement support part connecting a part of an inner peripheral surface of the outermost frame and a part of an outer peripheral surface of the outer frame 3 is provided. A drive unit for driving the outer frame 3 in a plane perpendicular to the optical axis A within the outermost frame by using the second rotational movement support part as a supporting point may be provided.

Further, by arranging the second rotational movement support part at a position (for example, on an outer surface side of the corner connecting the wall part 3a and the wall part 3b in FIG. 1) deviated about 90 degrees in the circumferential direction of the lens 2a from the position at which the rotational movement support part 6 is disposed, the optical unit 2 can be also moved in directions perpendicular to directions B and C shown in FIGS. 3A and 3B. In this way, by combining the movement of the outer frame 3 with respect to the outermost frame and the movement of the inner frame 4 with respect to the outer frame 3, the optical unit 2 can be moved two-dimensionally.

Also, although the rotational movement support part is formed in a dot form by the spherical protrusion 20 or balls 43 and 53 in the above description of the embodiments, the rotational movement support part may be formed in a linear form by, for example, a protruding string part extending in the optical axis A or the like.

INDUSTRIAL APPLICABILITY

The tilt correction unit as described above makes it easier to assemble parts.

REFERENCE SIGNS LIST 1, 1A to 1H, and 1J: tilt correction unit
2: optical unit
4: inner frame
7, 8, 30, and 33:
coil springs (elastic parts)
11, 15, and 36: drive units
3: outer frame
6, 40, and 50:
rotational movement support parts
12, 16, and 37: coils
54 and 55:
plate springs (elastic parts)
13, 17, and 38: magnets
80 and 80A: FPC (flexible substrate)
80c and 80e:
current-carrying parts ($1^{st}$ part)
80d and 80f:
current-carrying parts ($2^{nd}$ part)
A: optical axis

The invention claimed is:

1. A tilt correction unit comprising:
an inner frame, inside which an optical unit is held;
an outer frame surrounding the inner frame, with a gap formed between the inner frame and the outer frame around an entire perimeter of the inner frame;
at least one elastic part which is disposed between the outer frame and the inner frame and elastically supports the inner frame inside the outer frame;
a rotational movement support part that connects a part of an outer peripheral surface of the inner frame to a part of an inner peripheral surface of the outer frame and forms a supporting point for a center of a rotational movement of the inner frame inside the outer frame; and
at least one drive unit that comprises a magnet and a coil disposed opposite each other with a gap therebetween, with the magnet affixed to either the outer surface of the inner frame or the inner surface of the outer frame and the coil affixed to the other of the outer surface of the inner frame and the inner surface of the outer frame,
wherein the inner frame is driven by the drive unit and rotates about the rotational support part, inside the outer frame, in a plane perpendicular to the optical axis of the optical unit.

2. A tilt correction unit according to claim 1, wherein the at least one drive unit comprises two drive units, the drive units are symmetrically disposed with respect to a plane including the rotational movement support part and the optical axis.

3. A tilt correction unit according to claim 1, wherein the at least one elastic part comprises two elastic parts, the elastic parts are symmetrically disposed with respect to a plane including the rotational movement support part and the optical axis.

4. A tilt correction unit according to claim 1, wherein the tilt correction unit further comprises a flexible substrate and directions of larger-width surfaces of the flexible substrate are parallel to the optical axis.

5. A tilt correction unit according to claim 4, wherein a part of the flexible substrate branches off into a first part and a second part, and the first part and the second part are attached to different parts of the inner frame.

6. A tilt correction unit according to claim 4, wherein a part of the flexible substrate is attached along the outer peripheral surface of the inner frame.

7. A tilt correction unit according to claim 1, wherein the tilt correction unit further comprises a flexible substrate, a part of the flexible substrate branches off into a first part and a second part, and the first part and the second part are attached to other parts of the inner frame.

8. A tilt correction unit according to claim 7, wherein the first part and the second part are symmetrically disposed with respect to a plane including the rotational movement support part and the optical axis.

9. A tilt correction unit according to claim 7, wherein the first part and the second part have an equal width in a direction of the optical axis.

10. A tilt correction unit comprising:
- an inner frame, inside which an image pickup element is held;
- an outer frame surrounding the inner frame, with a gap formed between the inner frame and the outer frame around an entire perimeter of the inner frame;
- at least one elastic part which is disposed between the outer frame and the inner frame and elastically supports the inner frame inside the outer frame;
- a rotational movement support part that connects a part of an outer peripheral surface of the inner frame to a part of an inner peripheral surface of the outer frame and forms a supporting point for a center of a rotational movement of the inner frame inside the outer frame; and
- at least one drive unit that comprises a magnet and a coil disposed opposite each other with a gap therebetween, with the magnet affixed to either the outer surface of the inner frame or the inner surface of the outer frame and the coil affixed to the other of the outer surface of the inner frame and the inner surface of the outer frame,
- wherein the inner frame is driven by the drive unit and rotates about the rotational support part, inside the outer frame, in a plane perpendicular to the optical axis of the image pickup element.

11. A tilt correction unit according to claim 10, wherein the at least one drive unit comprises two drive units, the drive units are symmetrically disposed with respect to a plane including the rotational movement support part and the optical axis.

12. A tilt correction unit according to claim 10, wherein the at least one elastic part comprises two elastic parts, the elastic parts are symmetrically disposed with respect to a plane including the rotational movement support part and the optical axis.

13. A tilt correction unit according to claim 10, wherein the tilt correction unit further comprises a flexible substrate and directions of larger-width surfaces of the flexible substrate are parallel to the optical axis.

14. A tilt correction unit according to claim 13, wherein a part of the flexible substrate branches off into a first part and a second part, and the first part and the second part are attached to different parts of the inner frame.

15. A tilt correction unit according to claim 13, wherein a part of the flexible substrate is attached along the outer peripheral surface of the inner frame.

16. A tilt correction unit according to claim 10, wherein the tilt correction unit further comprises a flexible substrate, a part of the flexible substrate branches off into a first part and a second part, and the first part and the second part are attached to other parts of the inner frame.

17. A tilt correction unit according to claim 16, wherein the first part and the second part are symmetrically disposed with respect to a plane including the rotational movement support part and the optical axis.

18. A tilt correction unit according to claim 16, wherein the first part and the second part have an equal width in a direction of the optical axis.

* * * * *